United States Patent Office 3,268,520
Patented August 23, 1966

3,268,520
STEROID GUANYLHYDRAZONES AND PRODUCTION THEREOF
Siegismund Schütz and Karl-Heinz Meyer, Wuppertal-Elberfeld, Kurt Stoepel, Wuppertal-Vohwinkel, and Hans-Gunther Kroneberg, Haan, Rhineland, Germany, assignors to Farbenfabriken Bayer Aktiengesellschaft, Leverkusen, Germany, a corporation of Germany
No Drawing. Filed Jan. 15, 1964, Ser. No. 337,739
Claims priority, application Germany, Jan. 23, 1963, F 38,830
11 Claims. (Cl. 260—239.5)

The present invention relates to new steroid guanylhydrazones obtained from 20-carbonyl steroids and their production by methods hereinafter described. The new products and their acid salts exhibit useful cardio-tonic activity.

The action of aminoguanidine on steroids which contain a carbonyl group at the 3- or 17-position has already been described [J. Barnett and C. J. O. R. Morris, Biochemical Journal 40, 450 (1946), and M. Pesez, J. Bartos, J. Mathieu and J. Valls, Bull. Soc. Chim. France, 1958, 488]. The reaction products have been employed for physical measurements. However, reactions with steroids having a keto group at the 20-position and the novel products thereby resulting are not known and have not heretofore been described.

It has now been found that compounds of the following formula possess valuable biological properties:

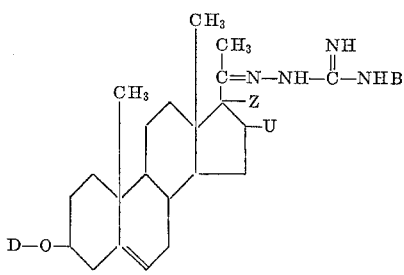

in which B is selected from the group consisting of hydrogen, alkyl of 1 to 6 carbon atoms, nitro and

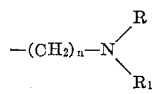

$n$ being 2–4, and R and $R_1$ each being separately alkyl of 1 to 6 carbon atoms and linked together to form a ring with the N atom,
Z is selected from the group consisting of hydrogen, hydroxyl and a double bond to U, U is selected from the group consisting of $H_2$ and H together with a double bond to Z, and D is selected from the group consisting of hydrogen and

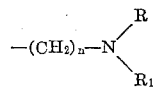

$n$, R and $R_1$ being as above defined.

These novel compounds exhibit cardio-tonic activity by themselves as such or in the form of their salts with non-toxic pharmaceutically acceptable inorganic or organic acids. Suitable acids are, for instance, acetic acid, propionic acid, lactic acid, maleic acid, fumaric acid, succinic acid, tartaric acid, citric acid, salicylic acid, naphthalene-1,5-disulfonic acid, phosphoric acid, hydrochloric acid and the like.

In accordance with the invention, the novel compounds are prepared by:

(a) reacting 20-carbonyl-steroids with aminoguanidines or their salts,
(b) reacting thiosemicarbazones of 20-carbonyl-steroids with amines,
(c) reacting S-alkylthio-isothiosemicarbazones of 20-carbonyl-steriods with amines, or
(d) reacting hydrazones of 20-carbonyl-steroids with cyanamides.

The thiosemicarbazones, S-alkyl-isothiosemicarbazones and hydrazones of 20-carbonyl-steroids which can be employed as the starting materials are obtained by the reaction of 20-carbonyl-steroids with thiosemicarbazides or S-alkyl-isothiosemicarbazides or thiosemicarbazides and alkyl halides or hydrazines.

The invention is illustrated by the following non-limitative examples.

Example 1

4 g. of pregn-5-en-3-ol-20-one are dissolved in methanol. A solution of 9.3 g. of aminoguanidine hydrogen carbonate in 300 ml. of approximately 1 N methanolic hydrochloric acid is added and the mixture is allowed to stand at room temperature for 60 hours. It is subsequently neutralized with solid sodium bicarbonate, filtered, and the filtrate is evaporated to dryness. The residue is recrystallized from ethanol several times, and 1 g. of the guanylhydrazone hydrochloride of pregn-5-en-3-ol-20-one of melting point 288–289° C. is obtained.

Example 2

5 g. of pregn-5-en-3-ol-20-one are dissolved in absolute tetrahydrofuran, 1 g. of sodamide moistened with xylene is introduced into this solution and boiled under reflux for 3 hours. When the evolution of ammonia has ceased, 2.8 g. of β-diethylamino-ethyl chloride are added, and it is subsequently boiled overnight while stirring. It is evaporated to dryness and the residue is dissolved in dilute acetic acid. The solution in acetic acid is rendered alkaline, decanted, and the residual viscous oil is dissolved in chloroform. It is dried, evaporated and 5.8 g. of 3-(β-diethylamino-ethoxy)-5-pregnene-20-one are obtained. 5 g. of this oil are dissolved in methanol, treated with a solution of 12 g. of aminoguanidine hydrogen carbonate in methanolic hydrochloric acid and left to stand at room temperature for 2 days while acidic to Congo red. It is neutralized with solid sodium bicarbonate, filtered and evaporated to dryness. The residue is dissolved in dilute acetic acid, the solution in acetic acid is rendered alkaline and extracted by shaking with chloroform. After drying and evaporation, hydrochloric acid in ether is added to the solution of the residue in dry alcohol in order to precipitate the dihydrochloride of 3-(β-diethyl-amino-ethoxy)-5-pregnene-20-guanylhydrazone of melting point 257–258° C.

The dihydrochloride of 3-(β-pyrrolidino-ethoxy)-5-pregnene-20-guanylhydrazone of melting point 260° C. is prepared in analogous manner.

Example 3

3.5 g. of 1-(β-diethylamino-ethyl)-3-aminoguanidine hydrochloride and 3 g. of pregn-5-en-3-ol-20-one in 20 ml. of methanol are left to stand at room temperature under nitrogen for 3 days. It is poured into ether, the separated precipitate is filtered off with suction, digested with acetone and recrystallized from ethanol. 1.5 g. of the dihydrochloride of pregn-5-en-3β-ol-20-[1-(β-diethylaminoethyl)-guanylhydrazone] of melting point 286–287° C. (decomp.) are obtained.

Example 4

3.5 g. of 1-(β-pyrrolidino-ethyl)-3-aminoguanidine hydroiodide are dissolved in enough methanolic hydrochloric acid for the resultant solution to have a pH value of 2. A solution of 3 g. of pregn-5-en-3-ol-20-one in 200 ml. of methanol is added to it and allowed to stand at room temperature for 3 days. The reaction mixture is subsequently poured into ether, the separated precipitate is boiled out with acetone and recrystallized from methanol. 2 g. of the dihydrochloride of pregn-5-en-3-ol-20-[1-(β-pyrrolidino-ethyl)-guanylhydrazone] of melting point 301–302° C. (decomp.) are obtained.

The hydrochloride of pregn-5-en-3-ol-20-(1-methylguanylhydrazone) or melting point 319–320° C. (decomp.) is prepared in analogous manner.

Example 5

A solution of 1.2 g. of 1-nitro-3-aminoguanidine in methanolic hydrochloric acid (pH=2) is treated with a solution of 3 g. of pregn-5-en-3-ol-20-one in 200 ml. of methanol and stirred at room temperature for 24 hours. The resultant precipitate is filtered off with suction and recrystallized from methanol/ether. 3.5 g. of pregn-5-en-3-ol-20-(1-nitro-guanylhydrazone) of melting point 215° C. (decomp.) are obtained.

Example 6

5 g. of 3-acetoxy-pregna-5,16-dien-20-one are dissolved in methanol, treated with a solution of 12 g. of aminoguanidine hydrogen carbonate in methanolic hydrochloric acid (acidic to Congo red), and left to stand at room temperature for 3 days. 1.5 g. of the hydrochloride of pregna-5,16-dien-3-ol-20-guanylhydrazone of melting point 314° C. are obtained.

Example 7

3 g. of pregn-5-ene-3β,17α-diol-20-one are dissolved in 750 ml. of hot methanol and treated with a solution of 2.7 g. of 1-(β-pyrrolidino-ethyl)-3-aminoguanidine hydrochloride in 50 ml. of methanol. It is stirred at room temperature under nitrogen for 3 days, the separated crystals are filtered off with suction and recrystallized from methanol with the addition of a little water.

Yield: 3 g. of the dihydrochloride of pregn-5-ene-3β,17α-diol-20-[1-(β-pyrrolidino-ethyl)-guanylhydrazole] of melting point 267–269° C. (decomp.)

1.6 g. of 1-ethyl-aminoguanidine hydrochloride are dissolved in methanolic hydrochloric acid, a solution of 2 g. of pregn-5-en-3β-ol-20-one in 150 ml. of methanol is added to it, and the reaction solution is left for 3 days before being introduced into ether. The resultant precipitate is filtered off with suction, boiled out with acetone and recrystallized from methanol.

Yield: 1 g. of the hydrochloride of pregn-5-en-3β-ol-20-(1-ethyl-guanylhydrazone) of melting point 268–270° C. (decomp.)

The hydrochloride of B-nor-pregn-5-en-3β-ol-20-guanylhydrazone of melting point 257° C. (decomp.) is obtained in analogous manner from B-nor-pregn-5-en-3β-ol-20-one and aminoguanidine hydrochloride.

What is claimed is:

1. A steroid guanylhydrazone of the formula:

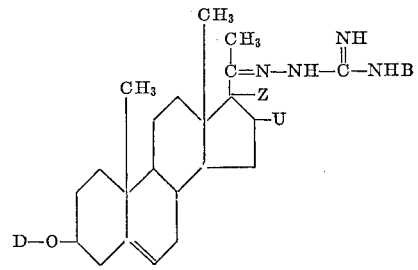

in which

B is selected from the group consisting of hydrogen, alkyl of 1 to 6 carbon atoms, nitro and

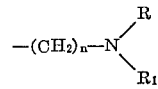

$n$ being 2–4, and R and $R_1$ each being separately alkyl of 1 to 6 carbon atoms and linked together to form a ring with the N atom, Z is selected from the group consisting of hydrogen, hydroxyl and a double bond to U, U is selected from the group consisting of $H_2$ and H together with a double bond to Z, and D is selected from the group consisting of hydrogen and

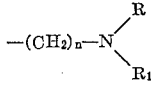

$n$, R and $R_1$ being as above defined.

2. The compound pregn-5-en-3-ol-20-one-guanylhydrazone hydrochloride.

3. The compound 3-(β-diethyl-amino-ethoxy)-5-pregnene-20-guanylhydrazone dihydrochloride.

4. The compound 3-(β-pyrrolidino-ethoxy)-5-pregnene-20-guanylhydrazone dihydrochloride.

5. The dihydrochloric of pregn-5-en-3β-ol-20-[1-(β-diethylaminoethyl)-guanylhydrazone].

6. The compound pregn-5-en-3-ol-20-[1-(β-pyrrolidinoethyl)-guanylhydrazone] dihydrochloride.

7. The compound pregn-5-en-3-ol-20-(1-methylguanylhydrazone) hydrochloride.

8. The compound pregn-5-en-3-ol-20-(1-nitroguanylhydrazone).

9. The compound pregna-5,16-dien-3-ol-20-guanylhydrazone hydrochloride.

10. The compound pregn-5-ene-3β,17α-diol-20-[1-(β-pyrrolidino-ethyl)-guanylhydrazone] hydrochloride.

11. The compound pregn-5-en-3β-ol-20-(1-ethylguanylhydrazone) hydrochloride.

References Cited by the Examiner

Barnett et al., Biochem. Jour., Vol. 40, pp. 450–53 (1946).

Pesez et al., Bull. Soc. Chim. France, page 488–90 (1958).

LEWIS GOTTS, *Primary Examiner.*

HENRY A. FRENCH, *Assistant Examiner.*